United States Patent
Abe

(10) Patent No.: US 6,829,085 B2
(45) Date of Patent: Dec. 7, 2004

(54) VIEWING APPARATUS HAVING A PHOTOGRAPHING SYSTEM

(75) Inventor: Tetsuya Abe, Hokkaido (JP)

(73) Assignee: PENTAX Corporation, Tokyo (JP)

(*) Notice: Subject to any disclaimer, the term of this patent is extended or adjusted under 35 U.S.C. 154(b) by 41 days.

(21) Appl. No.: 10/255,690

(22) Filed: Sep. 27, 2002

(65) Prior Publication Data
US 2003/0063381 A1 Apr. 3, 2003

(30) Foreign Application Priority Data
Sep. 28, 2001 (JP) .................................. 2001-301872

(51) Int. Cl.⁷ .............................................. G02B 27/02
(52) U.S. Cl. .................. 359/410; 359/411; 359/412; 359/413; 359/415; 359/416
(58) Field of Search ............................ 359/410–413, 359/415–418, 422, 407–409, 480–481, 362–363, 399

(56) References Cited

U.S. PATENT DOCUMENTS

| | | | |
|---|---|---|---|
| 3,981,021 A | * 9/1976 | Beecher | 396/432 |
| 4,067,027 A | 1/1978 | Yamazaki | |
| 4,183,640 A | * 1/1980 | Abe | 396/110 |
| 4,262,988 A | 4/1981 | Ishibai et al. | |
| 4,400,065 A | 8/1983 | Nagler | |
| 5,062,698 A | * 11/1991 | Funathu | 359/414 |
| 5,583,692 A | 12/1996 | Funatsu | |
| 5,729,390 A | 3/1998 | Abe | |
| 5,926,657 A | 7/1999 | Hasushita | |
| 5,973,830 A | * 10/1999 | Ichikawa | 359/415 |
| 5,999,312 A | * 12/1999 | Funatsu | 359/407 |
| 6,072,626 A | * 6/2000 | Ichikawa | 359/416 |
| 6,088,053 A | 7/2000 | Hammack et al. | |
| 6,476,969 B2 | * 11/2002 | Oka et al. | 359/582 |
| 2001/0028498 A1 | 10/2001 | Haga et al. | |

FOREIGN PATENT DOCUMENTS

| | | |
|---|---|---|
| JP | 57-79909 | 5/1982 |
| JP | 62-96919 | 5/1987 |
| JP | 5-2132 | 1/1993 |
| JP | 6-2330 | 1/1994 |
| JP | 7-283978 | 10/1995 |
| JP | 2624556 | 4/1997 |
| JP | 2001-281555 | 10/2001 |
| JP | 2001-311868 | 11/2001 |
| WO | 01/52531 | 7/2001 |

OTHER PUBLICATIONS

English Language Abstract of JP 11–248996.
English Language Abstract of JP 2001–311868.

\* cited by examiner

*Primary Examiner*—Mohammad Sikder
(74) *Attorney, Agent, or Firm*—Greenblum & Bernstein, P.L.C.

(57) ABSTRACT

A viewing apparatus includes a viewing optical system having a positive objective optical system and a positive eyepiece optical system, an image of an object formed through the positive objective optical system being viewed through the positive eyepiece optical system; a photographing optical system, provided independently from the viewing optical system, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an association mechanism which interconnects the first focusing mechanism with the second focusing mechanism; and an indicia indication optical system for selectively indicating the object image and an indicia image in a field of view viewing through the positive eyepiece optical system.

14 Claims, 3 Drawing Sheets

VIEWING APPARATUS HAVING A PHOTOGRAPHING SYSTEM

BACKGROUND OF THE INVENTION

1. Field of the Invention

The present invention relates to a viewing apparatus which includes a viewing optical system (e.g., a viewing optical system of a telescope or a binocular) and a photographing optical system for photographing an object viewed through the viewing optical system, wherein a distant object can be viewed visually and recorded as image data at the same time with the viewing apparatus.

2. Description of the Prior Art

Telescopes and binoculars are known as viewing apparatuses for viewing distant objects. However, such conventional viewing apparatuses do not have a function of recording object images which are viewed therethrough. Although there have been various proposals of combining a viewing apparatus such as a telescope or a binocular with a photographing system (e.g., a camera) to achieve such an image recording function, none of these proposals are practical for ordinary users.

When viewing a distant object through a viewing apparatus such as a telescope or a binocular, the user needs to perform a focusing operation to focus the viewing apparatus on the distant object to obtain a sharp image thereof. Likewise, when taking a picture of a distant object with a camera, the user needs to perform a focusing operation to focus the camera on the distant object to obtain a sharp image thereof. Accordingly, in the case where the viewing apparatus is combined with the camera, only a single focusing operation needs to be performed to take a picture of the distant object if the focusing mechanism of the viewing apparatus is interconnected with the focusing mechanism of the camera. This makes it possible for the user to concentrate on performing the focusing operation of the viewing apparatus, without being bothered by the focusing operation of the camera.

However, if the focusing mechanism of the viewing apparatus is simply interconnected with the focusing mechanism of the camera, the camera cannot be sharply focused on the object to obtain a sharp image thereof since vision varies between individuals. Namely, if different users having different visions perform a focusing operation, the focal point varies between the different users. Therefore, since vision varies greatly between individuals, the focal point also varies greatly between individuals as photographing with a camera. Consequently, a sharp, in-focus pictures can be difficult to obtain depending upon the user.

A method of preventing such a problem is known in the art. According to this known method, an indicia is disposed at a reference focusing point in an optical path of the viewing apparatus so that an image of the indicia can be seen in a field of view of the viewing apparatus, while the diopter of the viewing apparatus is corrected to correspond to the vision of an individual user with any known device such as a diopter correcting mechanism while the user is looking at the image of the indicia in the field of view.

To indicate an image of the indicia in the field of view of the viewing apparatus, a transparent member on which the indicia is imprinted needs to be disposed at the position where an object image is formed through the objective optical system of the viewing apparatus or a translucent member on which the indicia is imprinted needs to be disposed in an optical path of the viewing apparatus so that the object image and the image of the indicia are seen simultaneously through the viewing apparatus. However, scratches and/or dust on the transparent member are visible, and thus, distractive to the user's eyes in the case where the indicia is disposed at the position where an object image is formed through the objective optical system, and the transparent member deteriorates the optical performance of the viewing apparatus in the case where a translucent member is utilized. Moreover, the indicia is always seen in the field of view of the viewing apparatus, and hence, obstructs the view.

SUMMARY OF THE INVENTION

The present invention provides a viewing apparatus having both a viewing optical system such as a telescope or a binocular for viewing distant objects and a photographing system for photographing images of the distant objects, wherein the photographing system can photograph sharp and in-focus images of distant objects regardless of variations in vision between individual users, and wherein an image of the indicia is indicated in the field of view of the viewing optical system only when a diopter correcting operation is performed so that the image of the indicia does not obstruct the view.

As an aspect of the invention, a viewing apparatus is provided, including, a viewing optical system having a positive objective optical system and a positive eyepiece optical system, an image of an object formed through the positive objective optical system and viewed through the positive eyepiece optical system; a photographing optical system, provided independently from the viewing optical system, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an association mechanism which interconnects the first focusing mechanism with the second focusing mechanism; and an indicia indication optical system for selectively indicating the object image and an indicia image in a field of view viewing through the positive eyepiece optical system.

It is desirable for the indicia indication optical system to include a mask member having an indicia for forming the indicia image visually in the field of view, wherein a position of the mask member and a position where the object image formed through the positive objective optical system is in an in-focus state are optically conjugate in a state wherein the indicia image is indicated in the field of view via the indicia indication optical system.

It is desirable for the indicia indication optical system to include a light shield device which isolates a portion of the viewing optical system which is positioned in front of the indicia indication optical system in an optical axis direction of the viewing optical system from the remaining part of the viewing optical system.

The light shield member can be a movable reflection member which can be inserted into and retracted from an optical path of the viewing optical system, the indicia image being indicated in the optical path when the movable reflection member is in the optical path of the viewing optical system.

It is desirable for the movable reflection member to isolate a portion of the viewing optical system which is positioned in front of the movable reflection member in an optical axis direction of the viewing optical system from a remaining portion of the viewing optical system when inserted into the optical path of the viewing optical system.

It is desirable for the movable reflection member to be a total reflection mirror that totally reflects light incident thereon.

It is desirable for the viewing apparatus to further include a release mechanism for releasing the association mechanism so that the first focusing mechanism and the second focusing mechanism can operate independently from each other.

The viewing optical system can serve as a telescope optical system.

As another aspect of the invention, a viewing apparatus is provided, including a pair of viewing optical systems each having a positive objective optical system and a positive eyepiece optical system, an image of an object formed through the positive objective optical system and viewed through the positive eyepiece optical system; a photographing optical system, provided independently from the pair of viewing optical systems, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an association mechanism which interconnects the first focusing mechanism with the second focusing mechanism; and an indicia indication optical system for selectively indicating the object image and an indicia image in a field of view viewed through the positive eyepiece optical system.

It is desirable for the optical axis of the photographing optical system to be positioned between two optical axes of the pair of viewing optical systems.

The first focusing mechanism can be a manual focusing knob, and the association mechanism can include a gear train for transferring rotation of the manual focusing knob to the second focusing mechanism.

The first focusing mechanism can further include a screw shaft coaxially engaged with the manual focusing knob, and the release mechanism can include a disengaging mechanism for temporarily disengaging the manual focusing knob from the screw shaft without disengaging the manual focusing knob from the gear train.

The present disclosure relates to subject matter contained in Japanese Patent Application No. 2001-301872 (filed on Sep. 28, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
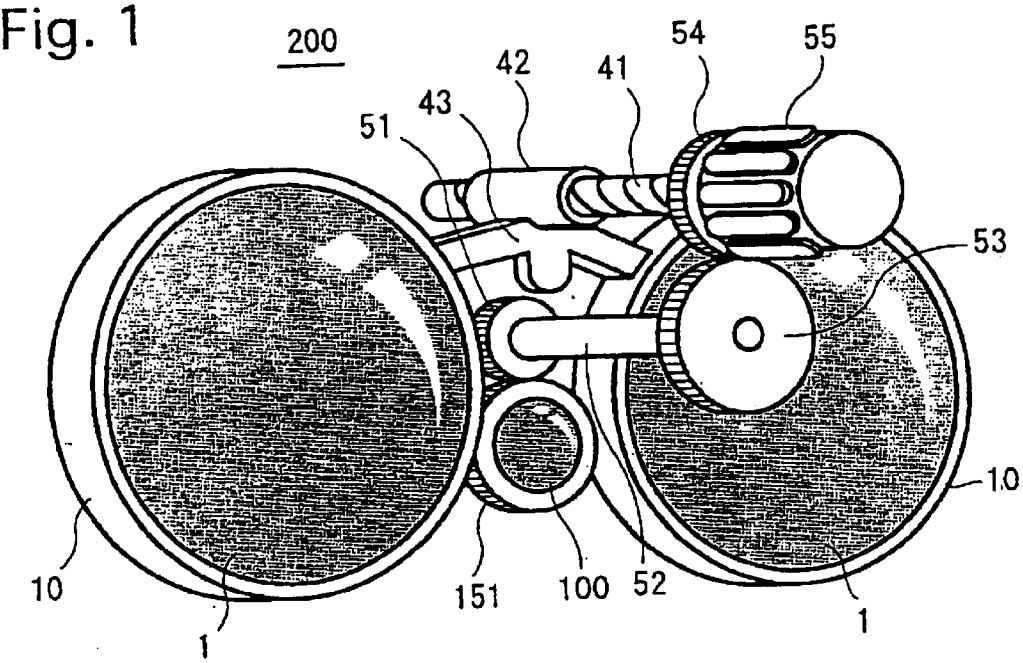
FIG. 1 is a schematic perspective view of fundamental elements of an embodiment of a viewing apparatus having a photographing system according to the present invention.

FIG. 1 shows fundamental elements of an embodiment of a viewing apparatus having a photographing system according to the present invention. The viewing apparatus 200 is constructed as a combination of a binocular having a binocular optical system with a photographing system having a photographing optical system 100.

The binocular optical system of the viewing apparatus 200 includes a pair of viewing optical systems (a pair of refracting telescope optical systems) 1. As known in the art, each viewing optical system 1 includes a positive objective optical system having a plurality of lens elements for forming an inverted object image which is upside down and reversed from left to right, an erecting optical system (e.g., a Porro prism erecting system) for erecting the inverted object image formed by the objective optical system to a proper orientation, and a positive eyepiece optical system for viewing the erected object image inverted by the erecting optical system, in that order from the object side. In FIG. 1, only a portion of the objective optical system of each viewing optical system 1 is shown as the viewing optical system 1 for the purpose of simplicity.

The photographing optical system 100 has a positive power, and is constructed from a plurality of lens elements. As shown in FIG. 1, the photographing optical system 100 is positioned between the pair of viewing optical systems 1, provided independently therefrom. In FIG. 1, only a portion of the photographing optical system 100 is shown as the photographing optical system 100 for the purpose of simplicity.

In each viewing optical system 1, a portion of the objective optical system is fixed to an objective lens frame 10. The two objective lens frames 10 are coupled to each other with an arm 43. A hollow cylindrical member 42 is fixed to top center of the arm 43. The hollow cylindrical member 42 is provided on an inner peripheral surface thereof with a female threaded portion (not shown) A screw shaft 41 is inserted in the hollow cylindrical member 42 so that a male threaded portion of the screw shaft 41 is engaged with the female threaded portion of the hollow cylindrical member 42. As shown in FIG. 1, a spur gear 54 is coaxially fixed to the rear end of the screw shaft 41, while a manual focusing knob 55 is coaxially fixed to the rear face of the spur gear 54.

Rotation of the manual focusing knob 55 causes the screw shaft 41 to rotate to thereby move the hollow cylindrical member 42 along the forward/backward direction of the viewing apparatus 200. When the hollow cylindrical member 42 moves forward/backward in this manner, the arm 43 and the two objective lens frames 10 that are fixed to the arm 43 concurrently move along the forward/backward direction of the viewing apparatus 200. Therefore, a portion (e.g., a focusing lens group) of the objective optical system of each viewing optical system 1 moves along the optical axis thereof by rotation of the manual focusing knob 55. Accordingly, the pair of viewing optical systems 1 that serve as a binocular optical system are focused on an object by manually turning the manual focusing knob 55.

The photographing system of the viewing apparatus 200 includes the photographing optical system 100, at least one rotatable lens barrel which accommodates the photographing optical system 100, and a helicoidal thread structure (i.e., a lens barrel drive structure using helicoidal threads) for driving the rotatable lens barrel(s). The rotatable lens barrel(s) is rotated to move the photographing optical system 100 along an optical axis O thereof to bring an object into focus with the helicoidal thread structure.

The photographing optical system 100 includes a positive first lens group 101 and a positive second lens group 102 in that order from the object side. The first lens group 101 is fixed to a lens frame of a photographing lens barrel 150 (see FIG. 3) of the viewing apparatus 200. The lens frame of the photographing lens barrel 150 is provided on an outer peripheral surface thereof with a spur gear portion 151 positioned about the optical axis O. The viewing apparatus 200 is provided below the screw shaft 41 with a drive shaft 52 which extends parallel to the screw shaft 41 in the forward/backward direction of the viewing apparatus 200. A front spur gear 51 which meshes with the spur gear portion 151 which is formed on a movable lens frame 110 (FIG. 3), and a rear spur gear 53 which meshes with the spur gear 54 of the screw shaft 41, are coaxially fixed to the front and rear ends of the drive shaft 52, respectively.

Due to such a gear mechanism (association mechanism/gear train), a rotation of the manual focusing knob 55 causes the movable lens frame 110 to rotate via the spur gear 54, the rear spur gear 53, the front spur gear 51 and the spur gear portion 151. Accordingly, the photographing system of the viewing apparatus 200 is focused on an object by manually turning the manual focusing knob 55 via the aforementioned helicoidal thread structure of the photographing system. Consequently, according to the gear mechanism shown in FIG. 1, the focusing operation of the pair of viewing optical systems 1 and the focusing operation of the photographing optical system 100 are interconnected to be performed concurrently.

Figure 2A:
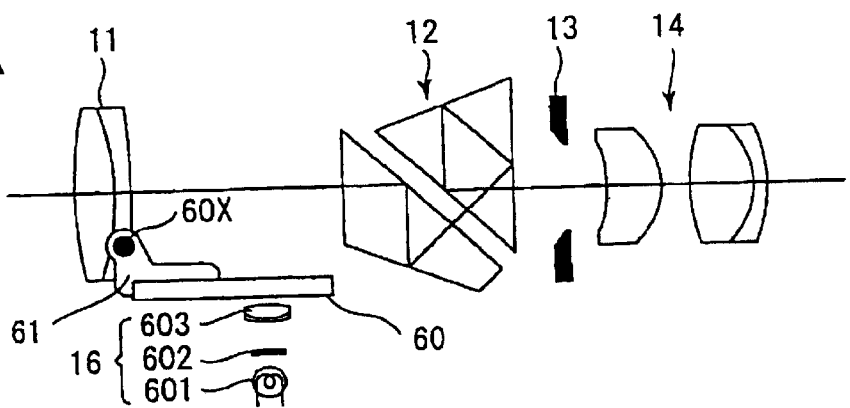
FIG. 2A is a cross sectional view of an embodiment of a viewing optical system of the viewing apparatus shown in FIG. 1, showing a state where an indicia indication optical member is retracted from an optical path of the viewing optical system.
Figure 2B:
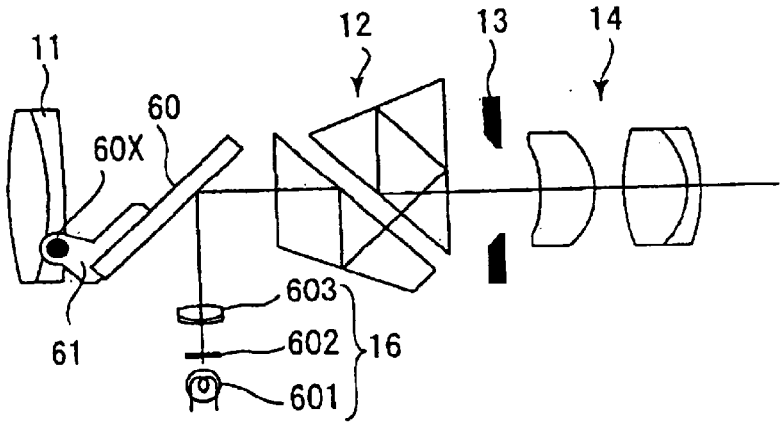
FIG. 2B is a view similar to that of FIG. 2A, showing a state where the indicia indication optical member is inserted in the optical path of the viewing optical system.

FIGS. 2A and 2B show an embodiment of each of the pair of viewing optical systems 1. Each viewing optical system 1 includes a positive objective optical system 11 having a front positive lens element and a rear negative lens element, a Porro prism erecting system 12 having two prisms for forming an inverted object image which is upside down and reversed from left to right, a field stop 13 disposed at a position where an image is formed through the objective optical system 11, and an eyepiece optical system 14 having a positive meniscus lens element, a positive lens element and a negative lens element for viewing the erected object image inverted by the erecting optical system, in that order from the object side.

Rotation of the manual focusing knob 55 causes the objective optical system 11 to move along the optical axis to thereby move an object image formed in the vicinity of the field stop 13 to move in the same direction at the same time. Accordingly, the focusing operation of the pair of viewing optical systems 1 is performed by rotation of the manual focusing knob 55.

As shown in FIGS. 2A and 2B, the viewing apparatus 200 is provided therein with two indicia indication optical systems 16 for the pair of viewing optical systems 1, respectively. With the two indicia indication optical systems 16, an object image (e.g., an object image shown in FIG. 5A) and a crossline image 604 (see FIG. 5B) serving as an indicia image can be selectively indicated in the field of view of each viewing optical system 1. Since the two indicia indication optical systems 16 are identical to each other, only one indicia indication optical system 16 will be hereinafter discussed in detail.

The indicia indication optical system 16 includes a plane mirror (total reflection mirror/movable reflection mirror) 60, a light source 601, a mask 602 and a projector lens 603. The plane mirror 60 is supported by a mirror supporting mechanism 61 so that the plane mirror 60 is rotatable about a rotational shaft 60X positioned in the outside of the optical path of the associated viewing optical system 1. The plane mirror 60, the rotational shaft 60X and the mirror supporting mechanism 61 constitutes a light shield device. The plane mirror 60 enters into and retracts from the optical path when rotated about the rotational shaft 60X. The plane mirror 60 serves as a movable reflection member.

The projector lens 603, the mask 602 and the light source 601 are arranged outside the optical path of the associated viewing optical system 1 in that order from the plane mirror 60 side. The mask 602 is generally made of an opaque material, and is provided at the center thereof with a transparent crossline portion for forming the crossline image 604 shown in FIG. 5B. The center of the transparent crossline portion lies on the optical axis of the associated viewing optical system 1 when the plane mirror 60 is inserted into the optical path between the objective optical system 11 and the Porro prism erecting system 12, i.e., when the plane mirror 60 is in the insertion position shown in FIG. 2B. The position of the mask 602 and the position of the field stop 13 are optically conjugate when the projector lens 603 in the state shown in FIG. 2B wherein the plane mirror 60 is in the insertion position.

FIG. 2A shows a state where the plane mirror 60 is retracted from the optical path of the associated viewing optical system 1, i.e., the plane mirror 60 is in the retracted position. If each viewing optical system 1 is in this state shown in FIG. 2A, no crossline image is seen through the pair of viewing optical systems 1, so that the pair of viewing optical systems 1 function as an ordinary pair of viewing optical systems.

In the state shown in FIG. 2B, the viewing optical system 1 is combined with the indicia indication optical system 16, except the objective optical system 11, wherein the plane mirror 60 is positioned behind the objective optical system 11 to isolate the objective optical system 11 from the optical path of the viewing optical system 1.

In the state shown in FIG. 2B, an image of the crossline portion formed on the mask 602 is projected to be formed at the position of the field stop 13 to be seen through the eyepiece optical system 14 when the light source 601 is turned on, since the position of the mask 602 and the position of the field stop 13 are determined to be optically conjugate.

Figure 3:
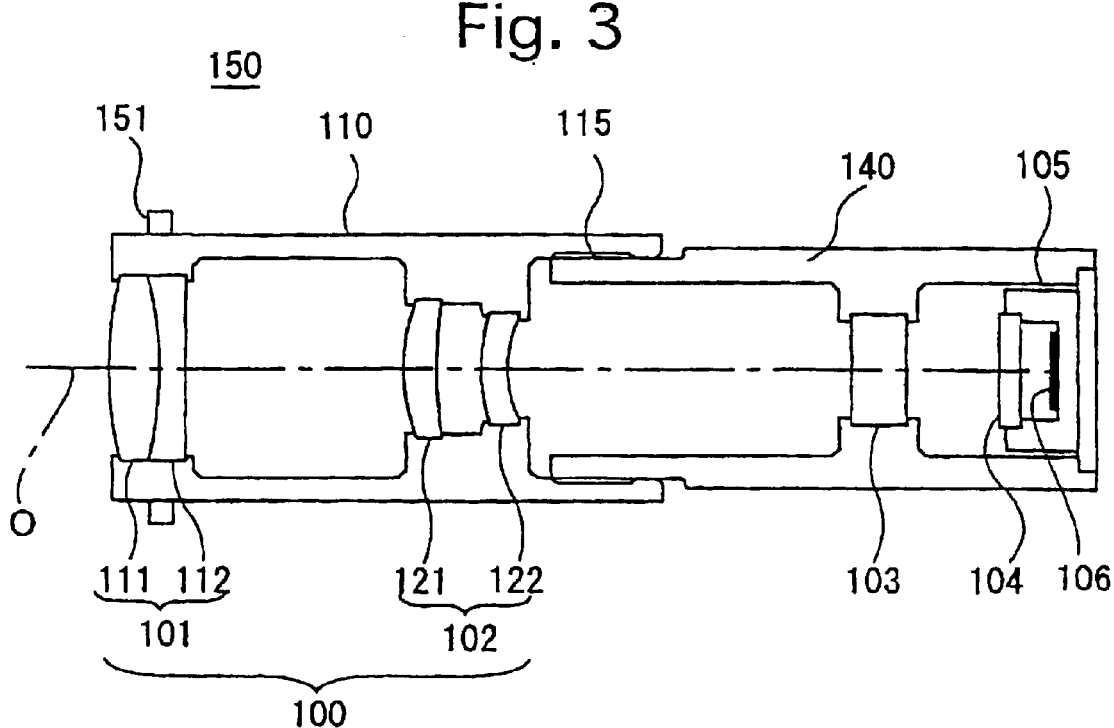
FIG. 3 is an axial cross sectional view of an embodiment of a photographing lens barrel of the viewing apparatus shown in FIG. 1.

FIG. 3 shows an embodiment of a photographing lens barrel 150 in which the photographing optical system 100 shown in FIG. 1 is supported. In the photographing lens barrel 150 shown in FIG. 3, the first lens group 101 of the photographing optical system 100 includes a first lens element 111 having positive power and a second lens element 112 having negative power. The first and second lens elements 111 and 112 are cemented to each other to serve as a single lens. The second lens group 102, which is positioned behind the first lens group 101, includes a third lens element 121 having positive power and a fourth lens element 122 having negative power.

The first lens element 111, the second lens element 112, the third lens element 121 and the fourth lens element 122 are arranged in that order from the object side, and are supported by the movable lens frame 110. The photographing lens barrel 150 is provided therein behind the second lens group 102 with a filter 103 and a CCD package 105 in that order from the object side. The CCD package 105 is provided with a CCD 106 serving as an image pick-up device, and a glass cover 104 positioned in front of the CCD 106. The filter 103 is a low-pass filter or/and an infrared absorbing filter. Although shown as a single filter in the drawing, the filter 103 can be more than one filter.

The photographing lens barrel 150 is provided with a fixed lens barrel 140 which accommodates and holds the filter 103 and the CCD package 105. The CCD package 105 is positioned at the rear end of the fixed lens barrel 140.

The movable lens barrel 110 is held by a fixed lens barrel 140 via a helicoidal thread structure (i.e., a lens barrel drive structure using helicoidal threads) 115. The helicoidal thread structure 115 is composed of a helicoidal male-threaded portion and a female helicoidal female-threaded portion which are engaged with each other, wherein the helicoidal male-threaded portion is formed on an outer peripheral surface of the fixed lens barrel 140 while the helicoidal female-threaded portion is formed on an inner peripheral surface of the movable lens barrel 110.

The movable lens frame 110 is provided on an outer peripheral surface thereof with the aforementioned spur gear portion 151 that is fixed to the movable lens frame 110 and positioned about the optical axis 0. The spur gear portion 151 meshes with the front spur gear 51 shown in FIG. 1 to be interconnected with the focusing mechanism of the binocular optical system.

Figure 4A:
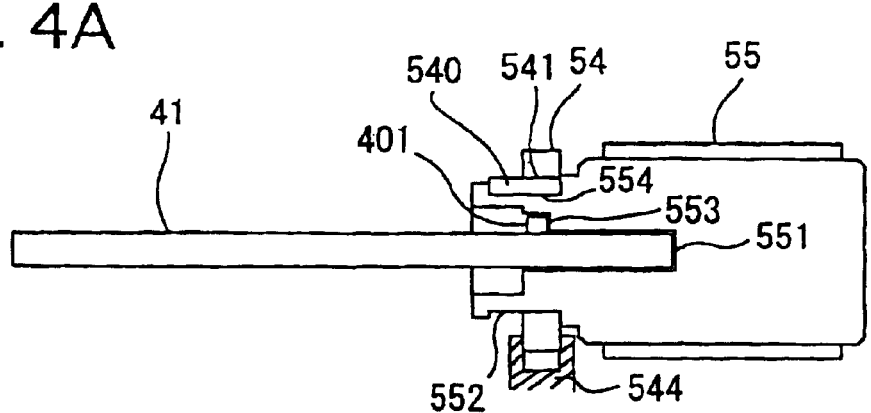
FIG. 4A is a cross sectional view of an embodiment of a release mechanism, provided in the viewing apparatus shown in FIG. 1, for releasing an interconnection between the focusing mechanism of the binocular optical system of the viewing apparatus and the focusing mechanism of the photographing optical system of the viewing apparatus, showing the release mechanism in an interconnected state.
Figure 4B:
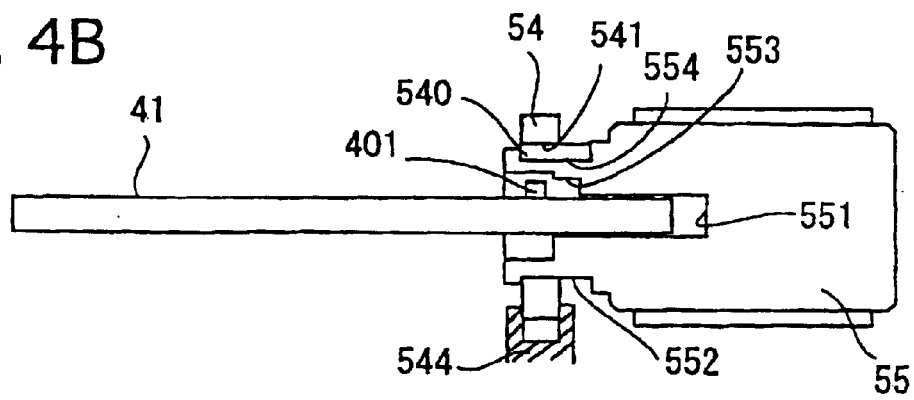
FIG. 4B is a view showing the release mechanism in a released state.

FIGS. 4A and 4B show an embodiment of a release mechanism (focusing-mechanism-interconnection release mechanism), provided in the viewing apparatus 200, for releasing interconnection between the focusing mechanism of the binocular optical system (i.e., the focusing mechanism of the pair of viewing optical systems 1) and the focusing mechanism of the photographing optical system. FIG. 4A shows the release mechanism in an interconnected state, while FIG. 4B shows the release mechanism in a released state.

The manual focusing knob 55 is provided along the axis thereof with an insertion hole 551 in which the rear end (the right end as viewed in FIGS. 4A and 4B) of the screw shaft 41 is inserted in a manner so that the rear end of the screw shaft 41 can freely move in the insertion hole 551 along an axis thereof. The screw shaft 41 is provided, on a portion thereof positioned in the manual focusing knob 55, with a radial projection 401 fixed to the screw shaft 41, while the manual focusing knob 55 is provided, in the vicinity of the front end (the left end as viewed in FIGS. 4A and 4B) of the insertion hole 551, with a radial recess 553 in which the radial projection 401 can be engaged. In a state where the radial projection 401 is engaged in the radial recess 553, the radial projection 401 cannot rotate about the axis of the screw shaft 41 relative to the manual focusing knob 55. The screw shaft 41, the radial projection 401, the radial recess 533 and the insertion hole 551 constitute a disengaging mechanism.

The screw shaft 41 moves integrally with the spur gear 54 in a direction of rotation, and is movable in an axial direction relative to the axis of the spur gear 54. The spur gear 54 is prevented from moving in an axial direction thereof by a stationary portion 544 fixed to a body (not shown) of the viewing apparatus 200, while the spur gear 54 is fitted on an outer cylindrical surface 552 formed on the manual focusing knob 55 so that the outer cylindrical surface 552 can move relative to the spur gear 54. The manual focusing knob 55 is provided on a portion of the outer cylindrical surface 552 with a key groove 554 which extends parallel to the axis of the screw shaft 41, and the spur gear 54 is provided, on an inner peripheral surface in the central hole of the spur gear 54, with a corresponding key groove 541 which extends parallel to the axis of the screw shaft 41 so that a key 540 is inserted in between the two key grooves 541 and 554. Due to this structure, the spur gear 54 and the manual focusing knob 55 rotate together as an integral unit about the axis of the screw shaft 41, and are movable along the axis of the screw shaft 41 relative to each other.

FIG. 4A shows a state (interconnected state) where the manual focusing knob 55 is pushed forward (leftward as viewed in FIG. 4A) relative to the screw shaft 41. In this state, the radial pin 401 that radially projects from the screw shaft 41 is engaged in the radial recess 553 that is formed in the manual focusing knob 55, so that the manual focusing knob 55 and the screw shaft 41 are fixed to each other in a direction of rotation about the axis of the screw shaft 41. In addition, since the manual focusing knob 55 and the spur gear 54 are fixed to each other in the same rotational direction as mentioned above, a rotation of the manual focusing knob 55 causes the screw shaft 41 and the spur gear 54 to rotate together at the same time. Accordingly, as has been described with reference to FIG. 1, the focusing mechanism of the binocular optical system and the focusing mechanism of the photographing optical system are interconnected to be performed simultaneously.

FIG. 2B shows a state (released state) where the manual focusing knob 55 is pulled rearward (rightward as viewed in FIG. 2B) relative to the screw shaft 41. In this state, the radial pin 401 is disengaged from the radial recess 553, so that the manual focusing knob 55 and the screw shaft 41 are free from each other in the rotational direction about the axis of the screw shaft 41. Therefore, rotation of the manual focusing knob 55 causes the spur gear 54 to rotate together at the same time, thus causing the actuation of the focusing mechanism of the photographing optical system, but does not cause the screw shaft 41 to rotate, thus not causing the actuation of the focusing mechanism of the binocular optical system. Accordingly, in the released state shown in FIG. 2B, the interconnection between the focusing mechanism of the binocular optical system and the focusing mechanism of the photographing optical system is released.

The operation of correcting the diopter of each viewing optical system 1 to correspond to the vision of the individual user with the indicia indication optical system 16 will be hereinafter discussed with reference to FIGS. 5A and 5B.

Figure 5A:
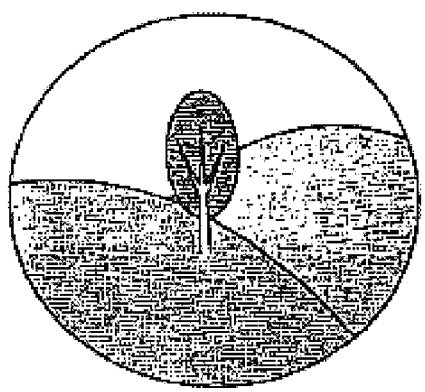
FIG. 5A is a schematic diagram of a field of view seen through the viewing apparatus shown in FIG. 1, showing a state where a landscape is seen as an object image through the viewing apparatus.

FIG. 5A shows a field of view seen through each viewing apparatus 1 when the plane mirror 60 is in the retracted position as shown in FIG. 2A. If the diopter of each viewing optical system 1 is corrected to correspond to the vision of the individual user, an object image formed through the objective optical system 11 is formed precisely at the position of the field stop 13. At this time, an object image formed through the photographing optical system 100 which corresponds to the object image shown in FIG. 5A is formed precisely on the sensitive surface of the CCD 106 (see FIG. 3).

In this state, if the viewing apparatus 200 is directed toward a different object located at a different distance, the position of the object image formed through objective optical system 11 deviates from the position of the field stop 13. Therefore, a blurry image of the object is seen through the pair of viewing optical systems 1. At the same time, a corresponding blurry image of the object is captured by the CCD 106 since an image of the object is formed at a position off the position of the sensitive surface of the CCD 106. Nevertheless, if only the manual focusing knob 55 is manually rotated so that the object image formed through the objective optical system 11 is formed at the position of the field stop 13 via the focusing mechanism of the binocular optical system, a sharp image of the object can be seen through the pair of viewing optical systems 1. In addition, since the focusing mechanism of the photographing optical system operates at the same time by the rotation of the manual focusing knob 55, a corresponding image of the same object is formed sharply on the sensitive surface of the CCD 106 to be captured thereby.

If the focus of the eye of the user deviates far from the position of the field stop 13, the eye is focused on a point further away from the field stop 13. In this case, a sharp object image can be seen through the viewing optical system 1 by moving the object image that is formed through the objective optical system 11 to the position off the field stop 13. However, at this time the CCD 106 can capture only a blurry object image since the image is formed at a position off the sensitive surface of the CCD 106.

Figure 5B:
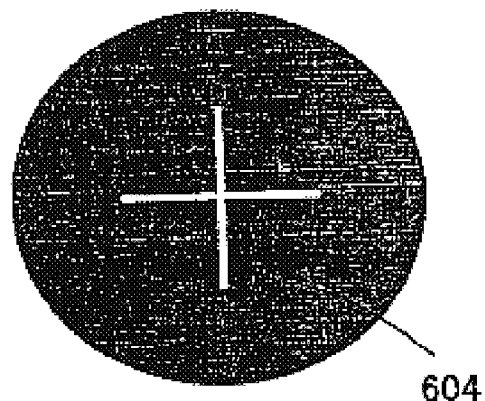
FIG. 5B is a view showing a state where an image of the indicia formed on the indicia indication optical member is seen through the viewing apparatus.

FIG. 5B shows an image seen through the viewing optical system 1 when the plane mirror 60 is in the insertion position shown in FIG. 2B. In this state, no object images are seen through the viewing optical system 1, only the crossline image 604 shown in FIG. 5B (which is formed at the position of the field stop 13) is seen through the viewing optical system 1 since the plane mirror 60 is positioned behind the objective optical system 11 to isolate the objective optical system 11 from the optical path of the viewing optical system 1. In this state, the light which is emitted by the light source 601 to be passed through the transparent crossline portion of the mask 602 forms the crossline image 604. This crossline image 604 is visible in a dark field of view through the eyepiece optical system 14.

Since the position of the mask 602 and the position of the field stop 13 are determined to be optically conjugate with the use of the projector lens 603 as mentioned above, the crossline image 604 is formed precisely at the position of the field stop 13. In this state, if the diopter of the viewing optical system 1 is corrected to correspond to the vision of the user so that the crossline image 604 can be clearly seen by the eye of the user, the diopter correcting operation is complete.

The diopter of each viewing optical system 1 can be corrected to correspond to the vision of an individual user with any known device such as a diopter correcting mechanism with which the eyepiece optical system (not shown) of each viewing optical system 1 can be moved in the optical axis thereof.

If an object is viewed with the viewing apparatus 200 with the plane mirror 60 having been retracted from the optical path between the objective optical system 11 and the Porro prism erecting system 12 after the diopter correcting operation is completed on each viewing optical system 1, each viewing optical system 1 and the photographing optical system 100 can be focused precisely on a common object at the same time.

As can be understood from the foregoing, according to the present invention, a viewing apparatus having a photographing system is achieved wherein the diopter correcting operation can be easily performed without deteriorating the quality of the image seen through the viewing optical system.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A viewing apparatus comprising:
   a viewing optical system having a positive objective optical system and a positive eyepiece optical system, an image of an object formed through said positive objective optical system being viewed through said positive eyepiece optical system;
   a photographing optical system, provided independently from said viewing optical system, for photographing said object image viewed through said positive eyepiece optical system;
   a first focusing mechanism for changing an image focal point of said object image formed through said positive objective optical system of said viewing optical system;
   a second focusing mechanism for changing an image focal point of an object image formed through said photographing optical system;
   an association mechanism which interconnects said first focusing mechanism with said second focusing mechanism; and
   an indicia indication optical system for selectively indicating said object image and an indicia image in a field of view viewing through said positive eyepiece optical system.

2. The viewing apparatus according to claim 1, wherein said indicia indication optical system comprises a mask member having an indicia for forming said indicia image visually in said field of view, and wherein a position of said mask member and a position where said object image formed through said positive objective optical system is in an in-focus state are optically conjugate in a state wherein said indicia image is indicated in said field of view via said indicia indication optical system.

3. The viewing apparatus according to claim 1, wherein said indicia indication optical system comprises a light shield device which isolates a portion of said viewing optical system which is positioned in front of said indicia indication optical system in an optical axis direction of said viewing optical system from the remaining part of said viewing optical system.

4. The viewing apparatus according to claim 1, wherein said light shield member comprises a movable reflection member which can be inserted into and retracted from an optical path of said viewing optical system, said indicia image being indicated in said optical path when said movable reflection member is in said optical path of said viewing optical system.

5. The viewing apparatus according to claim 4, wherein said movable reflection member isolates a portion of said viewing optical system which is positioned in front of said movable reflection member in an optical axis direction of said viewing optical system from a remaining portion of said viewing optical system when inserted into said optical path of said viewing optical system.

6. The viewing apparatus according to claim 4, wherein said movable reflection member comprises a total reflection mirror that totally reflects light incident thereon.

7. The viewing apparatus according to claim 1, further comprising a release mechanism for releasing said association mechanism so that said first focusing mechanism and said second focusing mechanism can operate independently from each other.

8. The viewing apparatus according to claim 1, wherein said viewing optical system serves as a telescope optical system.

9. A viewing apparatus comprising:
- a pair of viewing optical systems each having a positive objective optical system and a positive eyepiece optical system, an image of an object formed through said positive objective optical system being viewed through said positive eyepiece optical system;
- a photographing optical system, provided independently from said pair of viewing optical systems, for photographing said object image viewed through said positive eyepiece optical system;
- a first focusing mechanism for changing an image focal point of said object image formed through said positive objective optical system of said viewing optical system;
- a second focusing mechanism for changing an image focal point of an object image formed through said photographing optical system;
- an association mechanism which interconnects said first focusing mechanism with said second focusing mechanism; and
- an indicia indication optical system for selectively indicating said object image and an indicia image in a field of view viewed through said positive eyepiece optical system.

10. The viewing optical system according to claim 9, wherein said optical axis of said photographing optical system is positioned between two optical axes of said pair of viewing optical systems.

11. The viewing optical system according to claim 1, wherein said first focusing mechanism comprises a manual focusing knob, and wherein said association mechanism comprises a gear train for transferring rotation of said manual focusing knob to said second focusing mechanism.

12. The viewing optical system according to claim 11, wherein said first focusing mechanism further comprises a screw shaft coaxially engaged with said manual focusing knob, and wherein said release mechanism comprises a disengaging mechanism for temporarily disengaging said manual focusing knob from said screw shaft without disengaging said manual focusing knob from said gear train.

13. The viewing optical system according to claim 9, wherein said first focusing mechanism comprises a manual focusing knob, and wherein said association mechanism comprises a gear train for transferring rotation of said manual focusing knob to said second focusing mechanism.

14. The viewing optical system according to claim 13, wherein said first focusing mechanism further comprises a screw shaft coaxially engaged with said manual focusing knob, and wherein said release mechanism comprises a disengaging mechanism for temporarily disengaging said manual focusing knob from said screw shaft without disengaging said manual focusing knob from said gear train.

* * * * *